(12) United States Patent
Andrews et al.

(10) Patent No.: US 11,650,641 B2
(45) Date of Patent: May 16, 2023

(54) INFORMATION HANDLING SYSTEM MASS BALANCING THERMAL RESERVOIRS

(71) Applicant: Dell Products L.P., Round Rock, TX (US)

(72) Inventors: Maxwell S. Andrews, Novato, CA (US); Joseph P. Marquardt, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 17/158,370

(22) Filed: Jan. 26, 2021

(65) Prior Publication Data

US 2022/0236777 A1    Jul. 28, 2022

(51) Int. Cl.
*G06F 1/20* (2006.01)
*G06F 1/16* (2006.01)
*G05B 15/02* (2006.01)

(52) U.S. Cl.
CPC ............. *G06F 1/203* (2013.01); *G05B 15/02* (2013.01); *G06F 1/1616* (2013.01); *G06F 2200/201* (2013.01)

(58) Field of Classification Search
USPC ....................................................... 700/282
See application file for complete search history.

(56) References Cited

U.S. PATENT DOCUMENTS

| | | | |
|---|---|---|---|
| 6,519,148 B2 | 2/2003 | Nakagawa et al. | |
| 8,755,179 B2 | 6/2014 | Alyaser et al. | |
| 9,560,789 B2 | 1/2017 | Smith | |
| 9,639,126 B2 | 5/2017 | Senyk et al. | |
| 10,833,940 B2 | 11/2020 | Cencini et al. | |
| 2002/0039279 A1* | 4/2002 | Ishikawa | F28D 1/0308 361/679.47 |
| 2003/0214783 A1* | 11/2003 | Narakino | F28D 1/0308 361/679.53 |
| 2005/0083647 A1* | 4/2005 | Neho | G06F 1/203 361/679.08 |
| 2006/0207752 A1* | 9/2006 | Chiu | H01L 23/473 257/E23.098 |
| 2008/0291629 A1* | 11/2008 | Ali | G06F 1/203 361/699 |
| 2009/0279258 A1* | 11/2009 | Moore | G06F 1/203 16/221 |

(Continued)

FOREIGN PATENT DOCUMENTS

JP    2003229526 A    *    8/2003

*Primary Examiner* — Emilio J Saavedra
(74) *Attorney, Agent, or Firm* — Zagorin Cave LLP; Robert W. Holland

(57) ABSTRACT

A portable information handling system supports processing components in a housing having first and second portions rotationally coupled by a hinge to move between closed and clamshell positions. Each housing portion includes a cooling fluid reservoir that stores cooling fluid for transfer of thermal energy from a processing component. Cooling fluid moves between the first and second housing portion cooling fluid reservoirs to provide a balanced weight distribution for the information handling system based upon the position of the housing portions, such as to increase the weight of a base portion of the housing resting on a support surface while decreasing the weight of an opposing lid portion.

20 Claims, 4 Drawing Sheets

(56) References Cited

U.S. PATENT DOCUMENTS

| | | | |
|---|---|---|---|
| 2010/0006796 A1* | 1/2010 | Yang | C07C 59/48 |
| | | | 252/67 |
| 2016/0087669 A1* | 3/2016 | Kang | H04B 1/3833 |
| | | | 455/575.8 |
| 2019/0141861 A1 | 5/2019 | Shedd et al. | |
| 2019/0317571 A1* | 10/2019 | North | H05K 7/2039 |

* cited by examiner

INFORMATION HANDLING SYSTEM MASS BALANCING THERMAL RESERVOIRS

BACKGROUND OF THE INVENTION

Field of the Invention

The present invention relates in general to the field of portable information handling systems thermal management, and more particularly to an information handling system mass balancing thermal reservoirs.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One continuing effort of portable information handling system manufacturers is to minimize the footprint and weight of portable systems. Generally, portable systems are built around an integrated display that defines the width and length of the housing, so efforts to reduce system footprint and weight tend to focus on system thickness, also referred to as Z-height. One way to accomplish a more thin housing is to replace an integrated keyboard with a display that extends across both housing portions, such as a foldable plastic organic light emitting diode (POLED) display. Removal of the keyboard allows both housing portions to have the same dimensions so that a thinner overall housing is provided. In some instances, the thin structure and low weight of such a housing results in a less stable system when resting in a clamshell position on a support surface. For example, the raised housing portion can tip over in response to push, disrupting end user interactions and potentially causing damage to the system. Thin housings also tend to have difficulty with thermal constraints since cooling airflow through a low profile housing generally fights increased impedance. One alternative to forced airflow cooling is the use of a cooling fluid that flows proximate processing components to absorb thermal energy for release to the ambient environment, such as at fins exposed at air vents.

SUMMARY OF THE INVENTION

Therefore, a need has arisen for a system and method which provides information handling system mass balancing.

In accordance with the present invention, a system and method are provided which substantially reduce the disadvantages and problems associated with previous methods and systems for balancing an information handling system housing. A cooling fluid used in the information handling system housing to remove thermal energy from a processing component is moved between cooling fluid reservoirs to adjust the housing center of gravity. The center of gravity is adjusted based upon sensed conditions at the information handling system to enhance housing stability, such as by increasing weight in a base housing portion while decreasing weight in a lid housing portion.

More specifically, a portable information handling system housing has first and second portions rotationally coupled by a hinge to rotate between closed, clamshell and tablet positions. A processor and memory disposed in the housing cooperate to process information for presentation at an integrated display, such as a foldable OLED display coupled over both housing portions. A thermal interface, such as a heat sink, couples to a processing component to aid in transfer of thermal energy from the processing component to a cooling fluid that communicates with first and second cooling fluid reservoirs through a conduit. A pump interfaced with the conduit moves cooling fluid to the first or second cooling fluid reservoirs based upon a sensed housing orientation to adjust the housing center of gravity and improve the housing stability. For example, pumping all cooling fluid out of a reservoir of a raised housing portion and filling the reservoir of a base housing portion shifts the center of gravity of the housing towards the base housing portion to improve stability of the base housing portion resting on a support surface. The cooling fluid reservoirs and conduits may be integrated in and contiguous with the housing material to help promote thermal transfer across the housing exterior for rejection to the ambient environment.

The present invention provides a number of important technical advantages. One example of an important technical advantage is that an information handling system having a minimal weight is provided with enhanced stability by increasing weight at a base portion of the housing in a clamshell position and decreasing the weight at the lid portion of the housing. The base portion resists destabilization when resting on a support surface due to the lower center of gravity provided by cooling fluid that flows to the base housing portion and out of the lid housing portion. Integrating a cooling fluid reservoir in each housing portion and interfacing the cooling fluid reservoirs through an integrated conduit aids in dissipation of excess thermal energy across the housing surface for improved thermal management of processing components disposed in the housing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Cooling fluid disposed in an information handling system moves within a housing to provide a weight distribution that better balances the housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
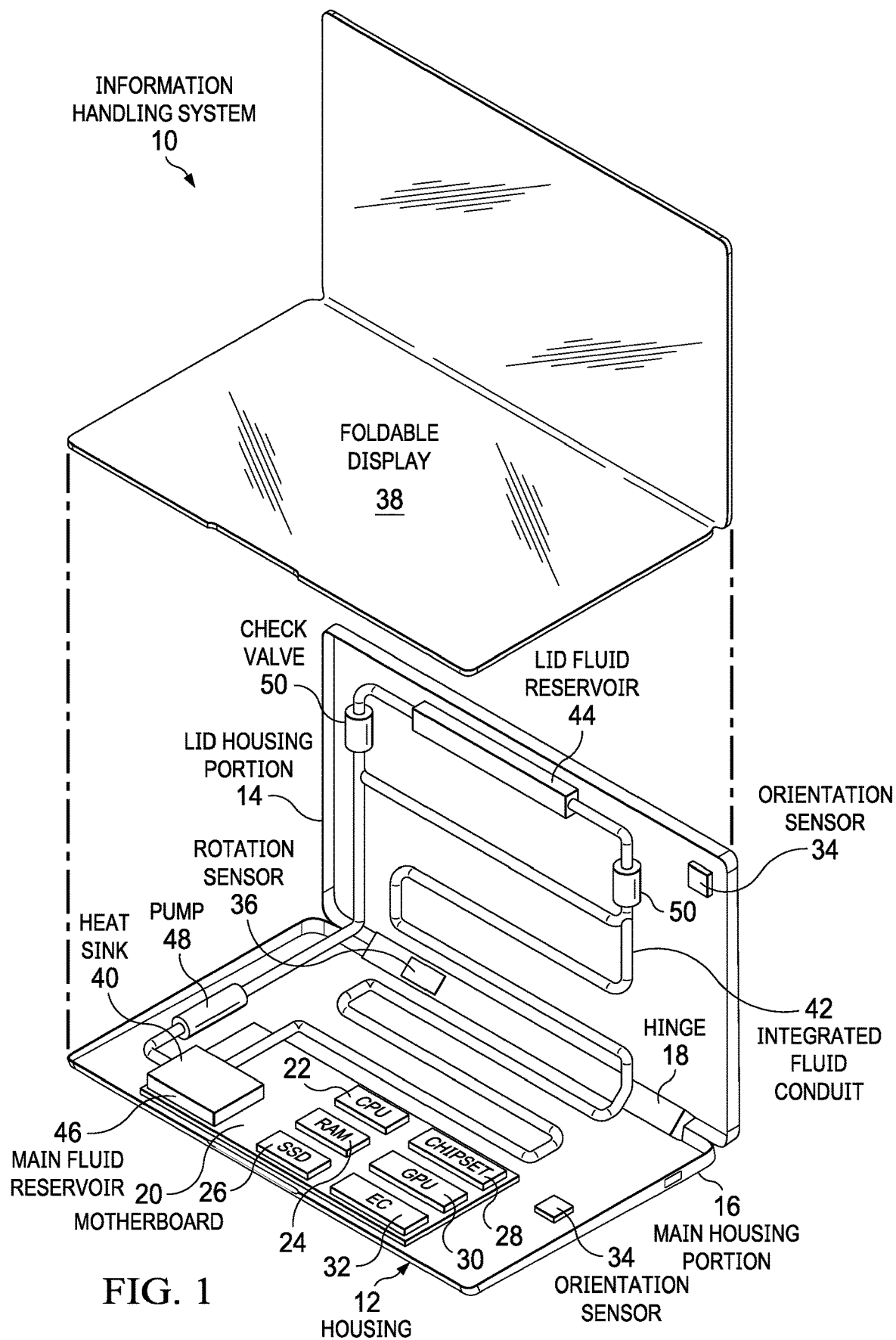
FIG. 1 depicts an exploded perspective view of a portable information handling system that balances a housing by moving cooling fluid between rotationally coupled housing portions.

Referring now to FIG. 1, an exploded perspective view depicts a portable information handling system 10 that balances a housing 12 by moving cooling fluid between rotationally coupled housing portions. In the example embodiment, housing 12 has a lid housing portion 14 and main housing portion 16 of equal proportions rotationally coupled to each other by a hinge 18 to allow rotation between at least a closed position and the clamshell position shown. Processing components disposed in housing 12 cooperate to process information, such as by communicating through a motherboard 20 coupled to main housing portion 16. For example, a central processing unit (CPU) 22 executes instructions that process information with the instructions and information stored in a random access memory (RAM) 24. A solid state drive (SSD) 26 provides persistent storage of the instructions and information, such as an operating system and applications that are retrieved at power up of the system to RAM 24. A chipset 28 manages operation of CPU 22, such as for clock speeds and memory accesses. A graphics processing unit (GPU) 30 interfaces with CPU 22 to process information into pixel values that define a visual image at a display, such as a foldable display 38 that couples over housing 12 and folds at hinge 18 during rotation of housing 12. An embedded controller 32 manages system operations, such as power and thermal conditions as well as interfaces with input/output devices like a keyboard and mouse. In the example embodiment, housing 12 has components disposed within it to have a balance of weight across housing 12. In alternative embodiments, housing 12 may have a greater weight on main housing portion 16, such as with the integration of a keyboard. The example embodiment provides a system with minimal weight that is evenly distributed by using foldable display 38 as main input device, such as with presentation of a virtual keyboard at one portion to accept key touches at a touchscreen sensor.

In the example embodiment, housing 12 has a minimal thickness and weight so that information handling system 10 has optimal mobility. In such low profile systems, rejection of excess thermal energy out of housing 12 presents a challenge since minimal space is provided for airflow under foldable display 38. Another challenge is that the low weight of the system can result in reduced stability when in an open configuration since the weight of main housing portion 16 does not sufficiently anchor to a support surface so that the raised weight of lid housing portion 14 can tip the system over. Further, with a foldable display 38 and no integrated keyboard, both main housing portion 16 and lid housing portion 14 can act as the base for resting on a support surface with the system is in a clamshell position. To manage both thermal rejection and system weight balance, a cooling fluid disposed in housing 12 dissipates thermal energy from the processing components for rejection to the external environment and also distributes within housing 12 to adjust weight distribution based upon system orientation, thus improving system stability. In the example embodiment, the cooling fluid communicates between a lid fluid reservoir 44 and a main fluid reservoir 46 through a conduit 42. When the cooling fluid is pumped into main fluid reservoir 46 and out of lid fluid reservoir 44, the system center of gravity is lowered towards main housing portion 16 so that the system is more stable when resting on main housing portion 16. When the cooling fluid is pumped into lid fluid reservoir 44 and out of main fluid reservoir 46, the system center of gravity is raised towards lid housing portion 14 so that the system is more stable when resting on lid housing portion 14.

Thermal management and center of gravity management are performed by logic executing on a processing resource, such as embedded controller 32. In the example embodiment, a heat sink 40 couples to CPU 22 to act as a thermal interface for transfer of thermal energy from CPU 22 to cooling fluid disposed in conduit 42, such as by flowing the cooling fluid through heat sink 40. A pump 48 provides flow of the cooling fluid to help with dissipation of thermal energy. For example pump 48 may be a microfluid pump, an actuated magnetic screw rotor/impeller, a gravity device, a thermosiphon device or similar device. Check valves 50 disposed along conduit 42 manage the location of the cooling fluid by restricting flow, such as with a bimetallic, shape memory or other passive flow balancer that increases or restricts cooling fluid flow in response to a control signal and/or temperature. Embedded controller 32, for instance, commands pump 48 to distribute cooling fluid through conduits 42 so that CPU 22 maintains a desired thermal constraint. The thermal energy dissipates across housing 12 and may also be aided by deployment to lid fluid reservoir 44 and main fluid reservoir 46, where the cooling fluid may rest and reject energy at the housing periphery.

In order to manage system center of gravity, logic operating on a processing component, such as embedded controller 32, applies pump 48 to distribute cooling fluid between lid fluid reservoir 44 and main fluid reservoir 46 based upon sensed orientation. The rotational orientation of information handling system 10 may be sensed with a variety of devices, such as orientation sensors 34 located in lid housing portion 14 and main housing portion 16, and a hinge rotation senor 36 that senses hinge 18 rotational position. Some examples of orientation sensors include accelerometers, gyroscopes or other devices that detect a relative position of the housings to each other. The cooling fluid is, for example, a sodium metatungstate solution in water that has a relatively high density. Logic on embedded controller 32 applies orientation sensor information to determine if main housing portion 16 or lid housing portion 14 is oriented as a base housing portion, and in response, pumps the cooling fluid into the fluid reservoir of the base housing portion and out of the fluid reservoir of the raised housing portion. Shifting of the weight of the cooling fluid responsive to orientation adaptively adjusts the system center of gravity so that stability on a support surface is enhanced. For example, pump 48 removes all cooling fluid from the raise fluid reservoir and closes the raised fluid reservoir with check valves 50. The cooling fluid fills the base fluid reservoir to increase the weight of the base housing portion, and check valves 50 manage the position of the cooling fluid to ensure both desired center of gravity and adequate processing component cooling.

In one example embodiment, with lid housing portion 14 and main housing portion 16 having substantially equal dimensions, an end user may place the system with either housing portion deployed as a base that holds the other housing portion in a raised position, and the end user may have no indication of which housing portion would be preferred as a base. In such an example, pump 48 may include a manual function with pumping of the cooling fluid driven by motion of the opening and closing of the hinge. For example, if an end user sets information handling system 10 on a support surface and then opens the system, a gravity based valve associated with pump 48 would direct the cooling fluid movement to a housing portion under manual pumping driven by hinge movement where the direction of the fluid is to a base portion determined from change in acceleration of the raised portion, such as with a gravity based check valve. In such an example, a rapid transfer of cooling fluid to the base portion aids in correct orientation of the system at placement on a support surface. This allows the device with an even weight distribution when folded to a closed position to be used in a clamshell position having a heavier "keyboard" base side where an end user's wrists will rest. An opposite pumping movement when in the open clamshell position and rotated to a closed position can return the weight distribution to neutral when closed. In addition, changes to orientation may be adapted to by manual pumping. In another example embodiment, checkvalves may be set to allow flow in only one direction so that passive movement by gravity directs cooling fluid to the lower housing portion over time. In various embodiments, other types of pumping mechanisms may be used. For example, flexible membranes, such as haptic components, may be used to transport cooling fluid proximate to a flexible display or at other locations in the housing other than conduits integrated in the housing material. As another example, the cooling fluid may include a ferrofluid that can be pumped and check-valved with electromagnets.

Figure 2:
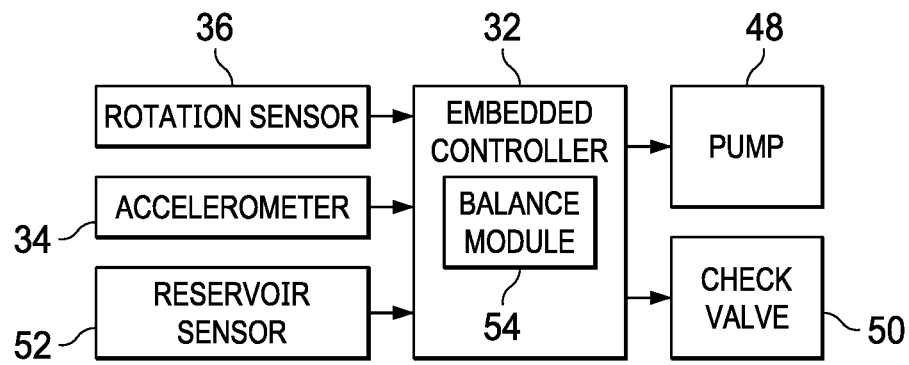
FIG. 2 depicts a block diagram of a system that moves cooling fluid within a housing to balance the housing.

Referring now to FIG. 2, a block diagram depicts a system that moves cooling fluid within a housing to balance the housing by adjusting the housing center of gravity. In the example embodiment, embedded controller 32 stores instructions of a balance module 54 in non-transitory memory, such as integrated flash memory, for execution to control distribution of cooling fluid in an information handling system housing. For instance, embedded controller 32 receives information from rotation sensors 36, orientation sensors 34 and reservoir sensors 52 that sense the amount of cooling fluid stored in the reservoirs. Balance module 54 analyzes the sensed hinge rotational position, housing portion accelerations and reservoir contents to evaluate a center of gravity position of housing 12 and orientation of housing 12. Based upon the sensed orientation of housing 12, balance module 54 commands pump 48 and check valve 50 to distribute the weight of the cooling fluid to the cooling fluid reservoirs so that the center of gravity of the system stabilizes a base housing portion at a support surface, as illustrated in greater detail below.

Figure 3A:
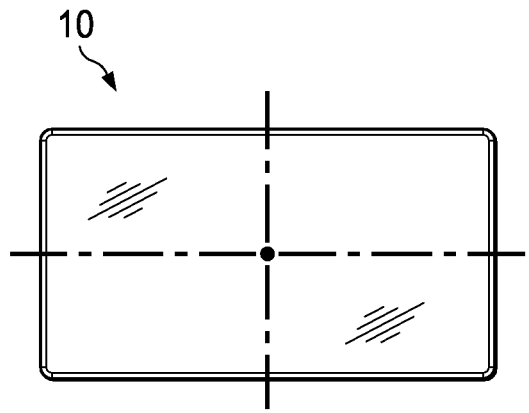
FIGS. 3A and 3B depict a portable information handling system in a closed or tablet position having a central center of gravity.
Figure 3B:
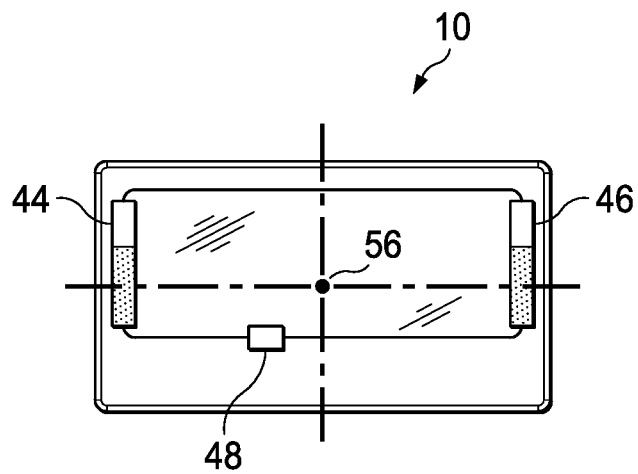

Referring now to FIGS. 3A and 3B, portable information handling system 10 is depicted in a tablet position having a central center of gravity 56. In the tablet position, the housing portions are rotated 180 degrees to a flat coplanar position having the display flat, rather than curved as in the clamshell position. FIG. 3A depicts a center of gravity 56 at a central location of the housing so that information handling system is balanced. FIG. 3B depicts that the balance is achieved by using pump 48 to evenly distribute cooling fluid between the cooling fluid reservoirs 44 and 46 at opposing sides of housing 12. The central weight distribution helps to steady the housing on a surface in the flat tablet position without adding bias that might tip the housing over. Although the tablet position is achieved with a completely flat position of the display, in an alternative embodiment, 360 degrees of rotation of the housing portions may provide a tablet position having a display exposed at both the upper and lower surfaces of the housing. In such an embodiment, additional fluid reservoirs may be provided so that a central center of gravity can be achieved, such as locating a third fluid reservoir near the hinge. Similarly, a balanced center of gravity can be achieved at system power down so that the housing in a closed position remains balanced. For example, at power down of the system pump 48 distributes all of the cooling fluid evenly between first and second cooling fluid reservoirs located on opposite sides of the same housing portion.

Figure 4A:
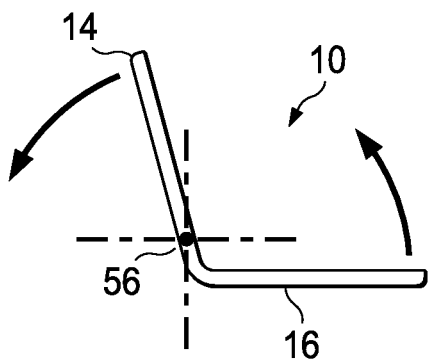
FIGS. 4A and 4B depict a portable information handling system in a clamshell position having the center of gravity unmanaged by moving the cooling fluid to the base housing portion.
Figure 4B:

Referring now to FIGS. 4A and 4B, portable information handling system 10 is depicted in a clamshell position having the center of gravity 56 unmanaged by moving the cooling fluid to the base housing portion. In the example embodiment, main housing portion 16 is the base portion resting on a support surface and lid housing portion 14 is the raised portion held in a raised position. FIG. 4A illustrates a center of gravity raised above the support surface and aligned in lid housing portion 14 due to an even distribution of cooling fluid between cooling fluid reservoirs as shown in FIG. 3B. To adjust the center of gravity 56, as shown in FIG. 4B, pump 48 moves the cooling fluid to main housing portion 16 to shift the center of gravity towards the center of the main housing portion as depicted. The shifting of center of gravity 56 towards main housing portion 16 tends to stabilize the housing on the support surface, as opposed to the less stable center of gravity 56 shown in FIG. 4A.

Figure 5A:
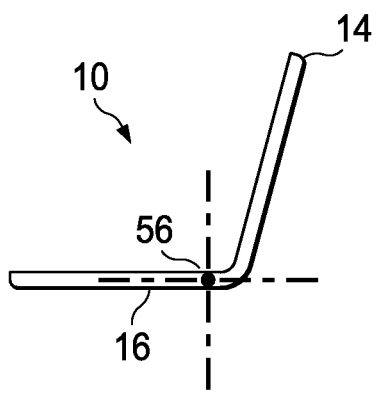
FIGS. 5A and 5B depict a portable information handling system in a clamshell position having the center of gravity manage by moving the cooling fluid to the base housing portion.
Figure 5B:
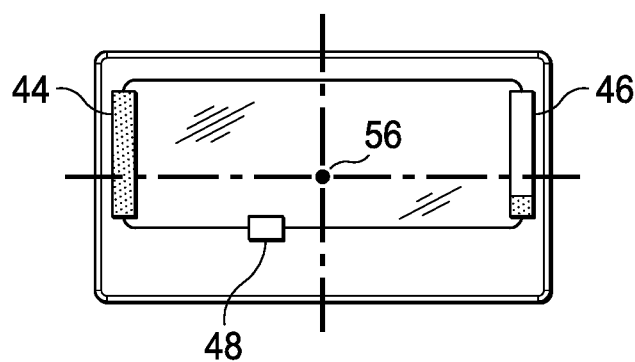

Referring now to FIGS. 5A and 5B, portable information handling system 10 is depicted in a clamshell position having the center of gravity 56 managed by moving the cooling fluid to the lid housing portion 14. FIG. 5A depicts lid housing portion 14 resting on a support surface as the base housing portion with main housing 16 held in the raise position. FIG. 5B depicts the cooling fluid moved to lid housing portion 14 by pump 48 so that the center of gravity 56 shown in FIG. 5A is achieved. In the example embodiments, some cooling fluid remains in the raised housing portion when the majority of cooling fluid is moved to the base housing portion. In some embodiments, the raised housing portion reservoir may be emptied completely, or may be used if necessary to help with rejection of thermal energy. For instance, if CPU operating temperatures approach a thermal constraint, the temperature might be reduced by moving cooling fluid into the raised housing portion reservoir at the expense of some system stability due to a shift in center of gravity 56, as shown in FIG. 4A.

Figure 6:
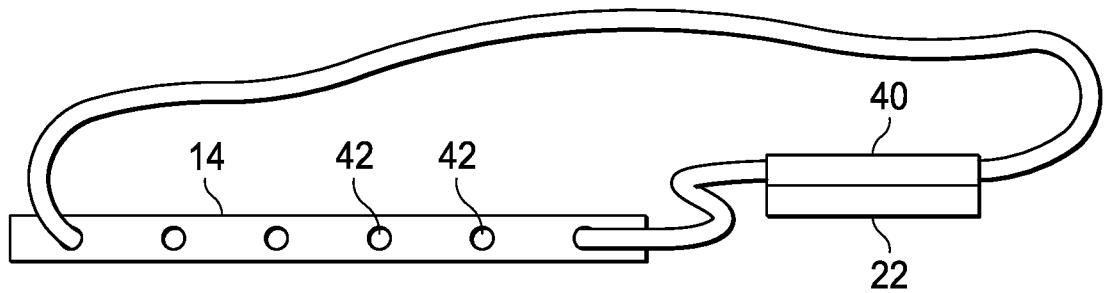
FIG. 6 depicts a sectional view of a housing portion having an integrated cooling fluid conduit.

Referring now to FIG. 6, a sectional view depicts a housing portion 14 having an integrated cooling fluid conduit 42. In the example embodiment, CPU 22 thermally couples to a heat sink 40 having integrated passages for the cooling fluid and interfaced with conduits 42. Integrating cooling fluid conduits 42 as contiguous with the material of housing portion 14 aids in efficient distribution of thermal energy into the housing material for rejection to the external environment. The integrated conduit 42 may be formed in a number of different manners, such as subtractive machining, etching or molding that contains an integrated tube by glue, braising, welding, thermal paste or other attachment techniques; additive machining with FDM, DMLS, metal powder binding, SLA, plating over wax filled channels, or similar additive techniques; or roll bonding or cladding with welding and heat. In addition, thermal reservoirs may be coupled to each housing portion as a separate entity or integrated in the housing similar to the conduit. Although the example embodiment has heat sink 40 coupled to CPU 22 as a thermal interface that conducts thermal energy from CPU 22, in alternative embodiments, heat sink 40 may couple to a separate part of the housing as an interface that rejects thermal energy brought to it through cooling fluid.

Figure 7:
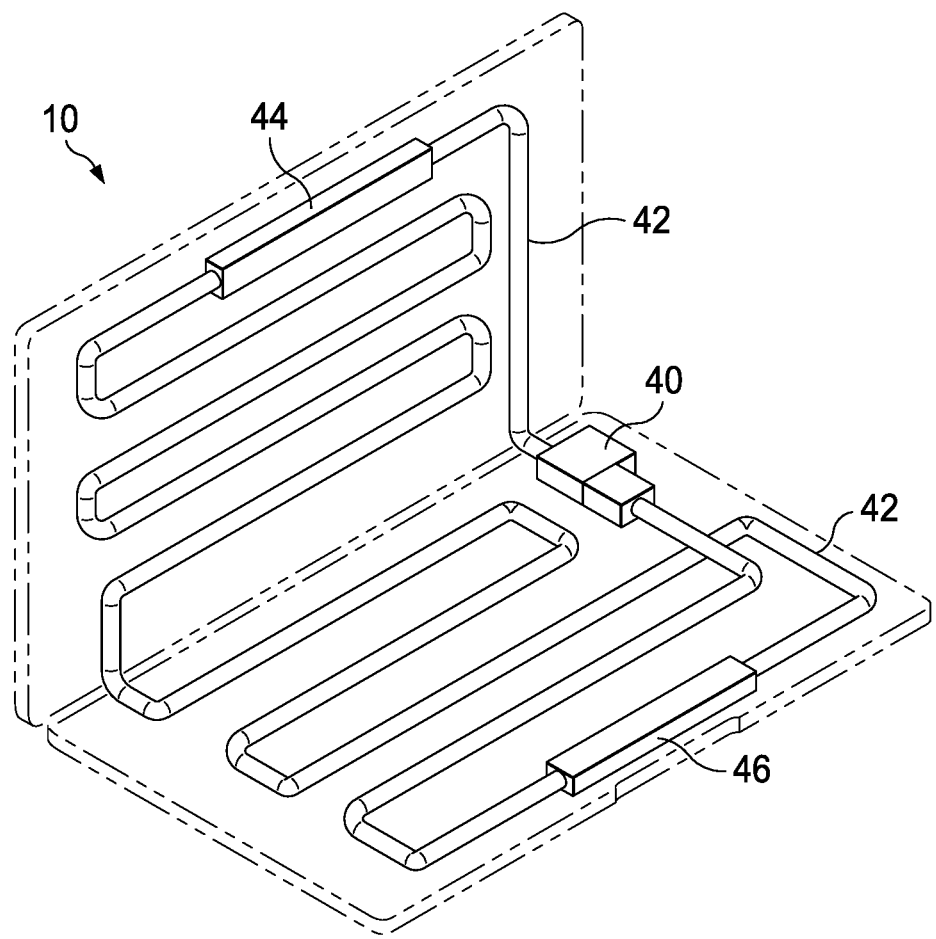
FIG. 7 depicts a perspective view of a portable information handling system having integrated cooling fluid conduits.

Referring now to FIG. 7, a perspective view depicts portable information handling system 10 having integrated cooling fluid conduits 42. In the example embodiment, conduits 42 are wound through housing 12 to interface the cooling fluid reservoirs 44 and 46. Distribution of conduits 42 through housing 12 helps to distribute excess thermal energy across the housing, thereby avoiding hotspots that may cause end user discomfort. As described above, one or more heat sinks 40 may be distributed within housing 12 and interfaced with the cooling fluid to help reject excess thermal energy.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having first and second portions rotationally coupled to each other to rotate between at least closed and clamshell positions;
   a processor disposed in the housing, the processor operable to execute instructions that process information;
   a memory disposed in the housing and interfaced with the processor, the memory operable to store the instructions and information;
   first and second reservoirs each operable to store a fluid, the first reservoir disposed in the first housing portion and the second reservoir disposed in the second housing portion; and
   a conduit interfacing the first and second reservoirs to transfer the fluid between the first and second reservoirs;
   wherein:
   when the housing has the clamshell position with the first housing portion as a base, the fluid fills the first reservoir; and
   when the housing has the clamshell position with the second housing portion as a base, the fluid fills the second reservoir.

2. The information handling system of claim 1 further comprising:
   one or more check valves disposed along the conduit; and
   wherein:
   when the housing has the clamshell position with the first housing portion as a base, the one or more check valves exclude the fluid from the second reservoir; and
   when the housing has the clamshell position with the second housing portion as a base, the one or more check valves exclude the fluid from the first reservoir.

3. The information handling system of claim 1 wherein the fluid comprises a solution having sodium metatungstate.

4. The information handling system of claim 1 further comprising:
   one or more sensors operable to detect an orientation of the first and second housing portions;
   a pump interfaced with the fluid and operable to selectively distribute the fluid to the first and second reservoirs; and
   a controller interfaced with the one or more sensors and the pump, the controller commanding the pump to distribute the fluid to the first and second reservoirs based upon the orientation.

5. The information handling system of claim 4 wherein the orientation comprises a closed position and the controller commands the pump to distribute the fluid substantially evenly between the first and second reservoirs.

6. The information system of claim 1 wherein the fluid transfers between the first and second reservoirs passively by force of gravity.

7. The information handling system of claim 1 wherein the first and second reservoirs integrate in the housing formed as a contiguous body.

8. The information handling system of claim 7 wherein the conduit integrates in the housing formed as a contiguous body.

9. The information handling system of claim 1 further comprising a foldable display disposed over the housing and configured to fold at the hinge when the first and second housing portions rotate.

10. A method for balancing an information handling system, the method comprising:
    detecting an orientation of a housing of the information handling system; and
    in response to the orientation, moving a cooling fluid from a first side of the housing to a second side of the housing to balance the housing with the weight of the cooling fluid.

11. The method of claim 10 further comprising:
    coupling a first cooling fluid reservoir to the first side of the housing;
    coupling a second cooling fluid reservoir to the second side of the housing;
    detecting the orientation of the second side of the housing as a base that rests on a support surface to hold the first side of the housing in a raised position over the support surface; and
    removing all of the cooling fluid from the first cooling fluid reservoir.

12. The method of claim 11 further comprising:
    detecting a change in orientation to the first side of the housing as the base that rests on the support surface; and
    in response to the detecting the change, removing all of the cooling fluid from the second cooling fluid reservoir and moving cooling fluid into the first cooling fluid reservoir.

13. The method of claim 12 further comprising:
    forming a conduit integrated in the housing contiguous with the housing material; and
    interfacing the first and second cooling fluid reservoirs through the conduit.

14. The method of claim 13 further comprising forming the first and second cooling fluid reservoirs in the housing contiguous with the housing material.

15. The method of claim 10 further comprising:
    thermally interfacing the cooling fluid with a processor of the information handling system; and
    dissipating thermal energy of the processor through the cooling fluid to the housing.

16. The method of claim 10 further comprising:
    detecting a change in orientation of the housing to a tablet position; and
    in response to the detecting a change in orientation to a tablet position, distributing the cooling fluid to both the first and second cooling fluid reservoirs.

17. A thermal management system comprising:
    a first cooling fluid reservoir configured to couple to a first housing portion;
    a second cooling fluid reservoir configured to couple to a second housing portion;
    a thermal interface configured to couple to a processing component to accept thermal energy from the processing component;
    a conduit interfacing the first cooling fluid reservoir, the second cooling fluid reservoir and the thermal interface;
    one or more sensors operable to detect an orientation of the first and second housing portions;
    a pump interfaced with the conduit and operable to move a cooling fluid between the first and second cooling fluid reservoirs; and
    a controller interfaced with the one or more sensors and the pump, the controller operable to move a cooling fluid between the first and second cooling fluid reservoirs based upon the orientation and to balance the first and second housing portions in the orientation.

18. The thermal management system of claim 17 further comprising a ferrofluid cooling fluid.

19. The thermal management system of claim 17 wherein the one or more sensors comprise an accelerometer and the orientation comprises a clamshell position having a base and lid, the controller further operable to fill the cooling fluid reservoir of the housing portion at the base.

20. The thermal management system of claim 19 wherein the controller is further operable to empty the cooling fluid reservoir of the housing portion at the lid.

* * * * *